May 28, 1957 — A. HALLUM — 2,793,470
TRANSPLANTER
Filed March 10, 1955
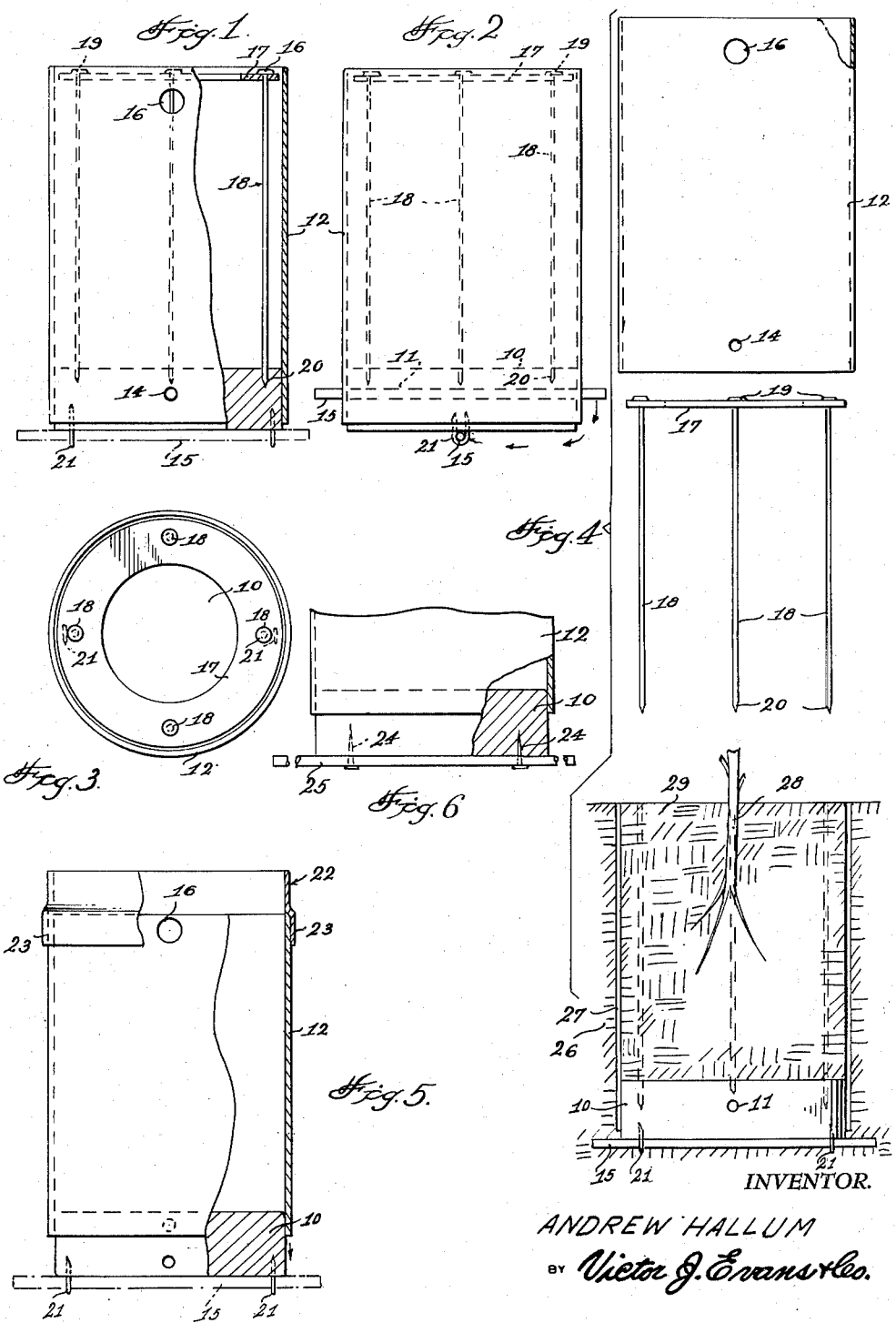
INVENTOR.
ANDREW HALLUM

United States Patent Office 2,793,470
Patented May 28, 1957

2,793,470
TRANSPLANTER
Andrew Hallum, Springfield, Mo.

Application March 10, 1955, Serial No. 493,475

4 Claims. (Cl. 47—37)

This invention relates to agricultural equipment, and more particularly to a device for use in transplanting flowers, plants, roots and the like.

The object of the invention is to provide a transplanter which will permit a quantity of soil containing plants, roots, or the like to be readily moved to different locations without the danger of harming the plants or roots.

Another object of the invention is to provide a transplanter which facilitates the movement of plants or roots from one location to another, whereby the device can be used over and over again, there being means provided for facilitating the gripping and handling of the transplanter.

A further object of the invention is to provide a transplanter which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the transplanter, constructed according to the present invention, and with parts broken away and in section.

Figure 2 is a view taken at right angles to the view shown in Figure 1.

Figure 3 is a plan view of the transplanter.

Figure 4 is an exploded view illustrating the various parts of the transplanter.

Figure 5 is an elevational view illustrating a modification.

Figure 6 is a fragmentary elevational view, with parts broken away and in section, illustrating a further modification.

Referring in detail to the drawings, the numeral 10 designates a cylindrical base which can be made of any suitable material and the base 10 is provided with an opening 11 for a purpose to be later described. A cylindrical casing or sleeve 12 has its lower end snugly embracing or engaging the base 10, and the casing 12 is provided with a pair of diametrically opposed openings 14 adjacent its rear end. The openings 14 register with the opening 11 in the base 10, and a rod 15 is adapted to be extended through the registering openings 14 and 11 for maintaining the casing 12 and base 10 connected together. However, by removing the rod 15 from these openings, the casing 12 can be separated from the base 10. The casing 12 is provided with cutouts or openings 16 adjacent its upper end, and these cutouts 16 can be used as hand grips or finger holds so that the casing 12 can be readily removed from the ground by placing the fingers or a hook in engagement with the cutouts 16.

There is further provided a ring 17 which has a plurality of pins 18 depending therefrom, and each of the pins 18 is provided with an enlarged head 19 on its upper end, the lower end of the pins 18 being tapered or pointed as at 20 for engagement with the base 10.

Depending from the base 10 and secured thereto is a plurality of securing elements which may be U-shaped staples 21, and after the rod 15 is removed from the openings 11 and 14, the rod can be extended through these staples 21 so as to provide a member which can be gripped by the hands when the transplanter is to be moved around or handled.

Referring to Figure 5 of the drawings there is shown a modification wherein a cap 22 is provided with a lower offset portion 23 which engages the top of the casing 12, and the cap 22 can be used for increasing the effective height of the casing 12 so that the dirt or soil will not accidentally fall out of the top of the casing. In Figure 6 there is shown a further modification wherein a rod 25 may be secured to the bottom of the base 10 by suitable securing elements such as the nails 24, and the rod 25 provides a handle for use in shifting or moving the base or transplanter as desired.

Referring to the lower portion of Figure 4 of the drawings, the numeral 26 designates a portion of the ground, while the numeral 27 designates a hole in the ground which is left when the casing 12 is removed, and the numeral 28 designates a plant or root which is to be transplanted. The numeral 29 designates the soil or earth which remains around the plant 28. Thus, it will be seen that by arranging a hook in engagement with the openings 16, the casing 12 can be removed to leave the soil 29 and 28 in the hole 27 and the ring 17 and pins 18 can also be removed after the transplanting has been accomplished. The pins 18 serve to help stabilize the ground 29 around the plant 28 as the plant is being moved and help prevent crumbling of the ground 29. However, after the plant has been properly positioned, the ring 17 and pins 18 can be readily removed and used over again.

From the foregoing it is apparent that there has been provided a transplanting device which will permit plants, roots and the like to be readily moved from place to place without damaging or injuring such plants. In use, with the parts assembled as shown in Figures 1 or 2, the assembly can be placed in a hole in the ground, the rod 15 being previously removed from the openings 14 and 11 and placed through the staples 21. Thus, the rod 15 can be used to manually shift the transplanter around as desired. Then, the casing 12 can be raised so as to leave the space 27, Figure 4. The pins 18 help prevent crumbling of the earth or soil 29 during movement of the soil but after it is placed in the hole, the pins 18 and ring 17 are removed leaving only the base 10 to support the soil 29 and plant 28. Thus, the casing 12 and pins 18 and ring 17 can be used over and over again.

In Figure 5 there is shown a modification wherein the cap 22 can be detachably mounted on the upper end of the casing 12 to increase the effective height of the casing. In Figure 6 a rod such as the rod 25 can be permanently secured to the undersurface of the base 10 by means of the nails 24.

If desired a suitable tool can be used for facilitating the transplanting of the plants or roots. Also, the block or base 10 can be removed if desired. The casing 12 is preferably removed before the pins 18 are removed so as to ordinarily hold down the base 10 when the casing 12 is being lifted to prevent the earth 29 from being loosened too much. The annular ring 17 also helps to hold down the soil 29 when the casing 12 is being removed. The rod 15 serves to detachably connect the casing and base together and after it has served this purpose it can be removed. Furthermore, when the rod 15 is extended through the staples 21, the rod can be used for helping to hold down the base 10 when the casing 12 is being raised or removed. The present invention is especially suitable for use in transplanting watermelon, tomato, and similar plants. Also, the present invention is extremely simple and inexpensive to manufacture.

The rod such as the rod 15 can be pulled out of the opening and can be used to loosen the soil which may stick to the casing. The extension member 22 shown in Figure 5 will prevent the soil from dropping out. Thus, the soil can be loosened from the casing by pulling the casing up and down. The bottom block 10 can be taken out by using a tool such as a spade which is provided with a point and a flat blade, the blade of this tool can be pushed over the top of the block 10 after the casing has been lifted up even with the top of the block. After the block 10 has been taken out, the casing 12 with its contents can be lowered and the tool can be pulled out. Next, soil can be filled in around the casing 12 before it is pulled out and the pins 18 can be pulled out also. The rod such as the rod 25 which is secured under the block 10 serves as a means of holding down the block with the feet in the event this is required. Also, a small board may be nailed onto the block and used as a substitute for the rod if the block is left in the ground.

I claim:

1. In a transplanter, a cylindrical base, said base being provided with a transverse diametral opening extending therethrough, a cylindrical casing having its top and bottom open, and the lower end of said casing snugly embracing said base, there being a pair of diametrically opposed openings in the lower end of said casing registering with the opening in said base, a rod extending through said registering openings, a ring arranged within the upper portion of said casing, a plurality of vertically disposed spaced parallel soil stabilizing pins depending from said ring and engaging said base, said pins having enlarged heads on their upper ends and the lower ends of said pins being pointed.

2. The structure as defined in claim 1, and further including securing elements depending from said base.

3. The structure as defined in claim 1, wherein the upper portion of said casing is provided with a plurality of cutouts.

4. A transplanter, comprising a cylindrical base, said base being provided with a transverse diametral opening extending therethrough, a cylindrical casing having its top and bottom open, the lower end of said casing snugly embracing said base, there being a pair of diametrically opposed openings in the lower end of said casing registering with the opening in said base, a rod extending through said registering openings whereby by removing the rod from the registering openings, the casing can be separated from the base, a ring arranged within the upper portion of said casing, a plurality of vertically disposed spaced parallel soil stabilizing pins depending from said ring and engaging said base, said pins having enlarged heads on their upper ends and the lower ends of said pins being pointed for engagement with the base, U-shaped securing elements depending from said base whereby after the rod has been removed from the registering openings, the rod can be extended through the securing elements so as to provide a member which can be gripped by the hands when the transplanter is to be moved around or handled, the upper portion of said casing being provided with a plurality of cutouts, said cutouts adapted to be used as hand grips for finger holds so that the casing can be readily removed from the ground by placing the fingers or a hook in engagement with the cutouts.

References Cited in the file of this patent

UNITED STATES PATENTS

| | | |
|---|---|---|
| 579,295 | Delzell | Mar. 23, 1897 |
| 1,031,713 | Hills | July 9, 1912 |
| 2,021,793 | Lam | Nov. 19, 1935 |
| 2,261,384 | Jones | Nov. 4, 1941 |
| 2,594,307 | Valenzuela | Apr. 29, 1952 |

FOREIGN PATENTS

| | | |
|---|---|---|
| 443,659 | France | July 19, 1912 |
| 566,530 | Great Britain | Jan. 2, 1945 |